United States Patent
Marusawa

(10) Patent No.: US 11,794,243 B2
(45) Date of Patent: Oct. 24, 2023

(54) METHOD FOR MANUFACTURING MAGNETIC POWDER, METHOD FOR MANUFACTURING COMPACT, MAGNETIC POWDER, AND COMPACT

(71) Applicant: Murata Manufacturing Co., Ltd., Kyoto-fu (JP)

(72) Inventor: Hiroshi Marusawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 292 days.

(21) Appl. No.: 17/367,010

(22) Filed: Jul. 2, 2021

(65) Prior Publication Data
US 2022/0062987 A1   Mar. 3, 2022

(30) Foreign Application Priority Data

Aug. 25, 2020   (JP) ................ 2020-141897

(51) Int. Cl.
| | |
|---|---|
| *B22F 1/102* | (2022.01) |
| *H01F 1/26* | (2006.01) |
| *H01F 1/34* | (2006.01) |
| *B82Y 25/00* | (2011.01) |
| *B82Y 40/00* | (2011.01) |
| *B82Y 30/00* | (2011.01) |

(52) U.S. Cl.
CPC ............... *B22F 1/102* (2022.01); *H01F 1/26* (2013.01); *H01F 1/344* (2013.01); *B22F 2301/35* (2013.01); *B22F 2304/054* (2013.01); *B22F 2304/056* (2013.01); *B22F 2304/058* (2013.01); *B82Y 25/00* (2013.01); *B82Y 30/00* (2013.01); *B82Y 40/00* (2013.01)

(58) Field of Classification Search
CPC ............. H01F 1/26; H01F 1/334; B22F 1/162
See application file for complete search history.

(56) References Cited

U.S. PATENT DOCUMENTS

2004/0161600 A1* 8/2004 Igarashi .............. H01F 41/0246
428/328

FOREIGN PATENT DOCUMENTS

| JP | 2008-244023 A | 10/2008 |
|---|---|---|
| JP | 2009-194040 A | 8/2009 |
| JP | 2010-529661 A | 8/2010 |
| JP | 2016-092403 A | 5/2016 |
| JP | 2018-152383 A | 9/2018 |

* cited by examiner

*Primary Examiner* — C Melissa Koslow
(74) *Attorney, Agent, or Firm* — Studebaker & Brackett PC

(57) ABSTRACT

A method for manufacturing a magnetic powder includes a step of producing a magnetic powder by spray-drying a spray liquid containing first magnetic particles, second magnetic particles, a thermosetting resin, and an organic solvent. A magnetic powder includes first magnetic particles and a thermosetting resin coating film on surfaces of the first magnetic particles. The first magnetic particles are soft magnetic metal particles. The resin coating film contains second magnetic particles. The second magnetic particles have a smaller average particle size than the first magnetic particles.

20 Claims, 5 Drawing Sheets

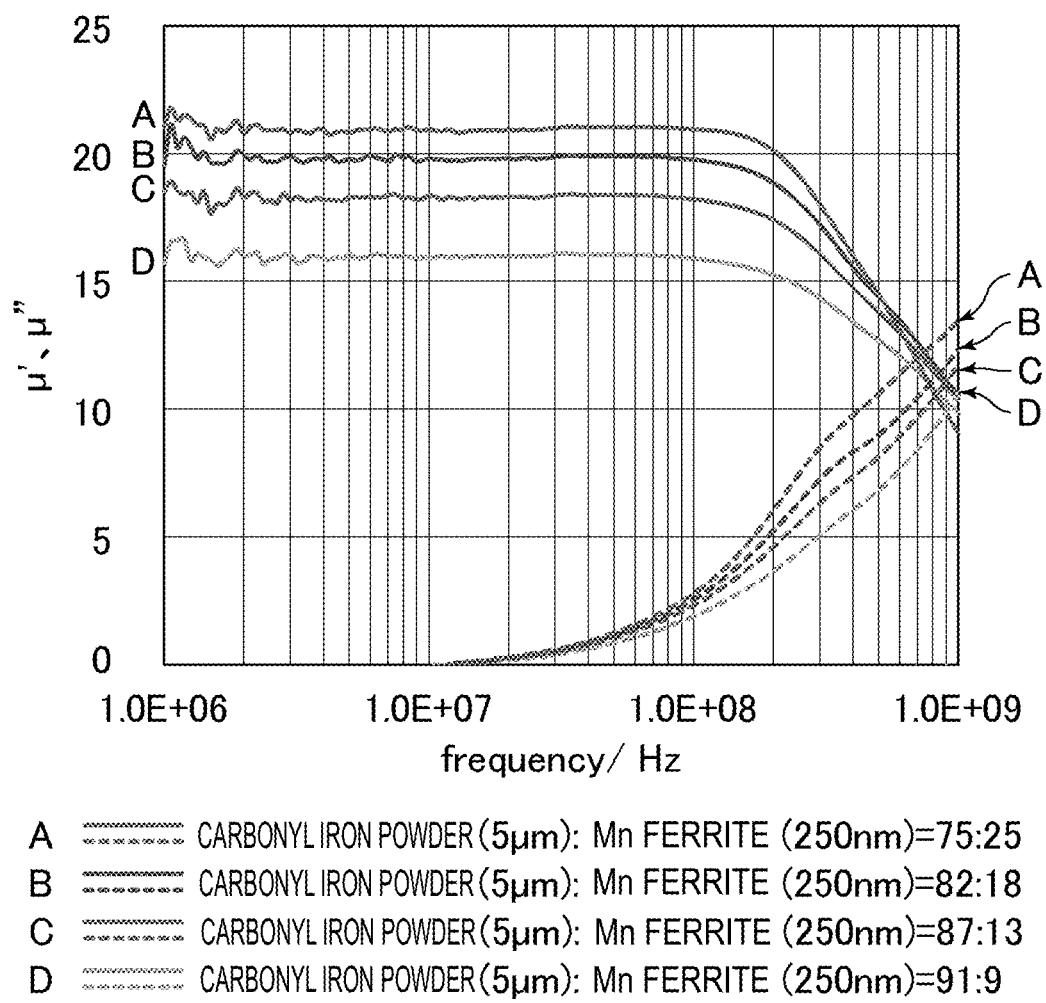

METHOD FOR MANUFACTURING MAGNETIC POWDER, METHOD FOR MANUFACTURING COMPACT, MAGNETIC POWDER, AND COMPACT

CROSS-REFERENCE TO RELATED APPLICATION

This application claims benefit of priority to Japanese Patent Application No. 2020-141897, filed Aug. 25, 2020, the entire content of which is incorporated herein by reference.

BACKGROUND

Technical Field

The present disclosure relates to a method for manufacturing a magnetic powder, a method for manufacturing a compact, a magnetic powder, and a compact.

Background Art

One of methods for manufacturing a powder magnetic core is described in Japanese Unexamined Patent Application Publication No. 2008-244023. In this method, a soft magnetic powder, an epoxy resin (binder), and toluene (organic solvent) are mixed to form a mixture. The formed mixture is stirred and then dried to form dried agglomerates. Next, the dried agglomerates are sieved and grounded into a granulated powder. The obtained granulated powder is packed into a mold to form a compact. The formed compact is heated to cure the binder. A powder magnetic core is produced accordingly.

Other features, elements, characteristics and advantages of the present disclosure will become more apparent from the following detailed description of preferred embodiments of the present disclosure with reference to the attached drawings.

SUMMARY

The magnetic permeability of a powder magnetic core can be increased by densely packing a granulated powder during manufacture of the powder magnetic core. However, the granulated powder obtained in the method for producing a granulated powder from a dried mixture containing a soft magnetic powder tends to aggregate, and it is thus difficult to densely pack the granulated powder. For this, the step of disintegrating the granulated powder and the step of classifying the granulated powder may be carried out before the step of packing the granulated powder as described in Japanese Unexamined Patent Application Publication No. 2008-244023. However, the granulated powder in the form of aggregates is hard. It is thus difficult to reduce the particle size of the granulated powder, and an additional step is required to reduce the particle size, making the manufacturing process complicated. Disintegration of the granulated powder may cause the surfaces exposed by disintegration to have no insulating film, such as a film made of epoxy resin or the like and thus may result in inadequate formation of the insulating film.

The magnetic permeability of the powder magnetic core may be further increased by, for example, adding magnetic particles having an average particle size in nanometer scale, which have a smaller average particle size than a soft magnetic powder. For example, a method for producing a granulated powder from a dried mixture containing a soft magnetic powder and fine magnetic particles may be proposed with reference to the method described in Japanese Unexamined Patent Application Publication No. 2008-244023. In this method, however, the granulated powder is more likely to aggregate because of the Van der Waals force of the fine magnetic particles.

Accordingly, the present disclosure provides a method for manufacturing a magnetic powder that contains fine magnetic particles but causes less aggregation. Also, the present disclosure provides a method for manufacturing a compact by using the magnetic powder produced by the above manufacturing method. In addition, the present disclosure provides a magnetic powder that contains fine magnetic particles but causes less aggregation and a compact containing the magnetic powder.

A method for manufacturing a magnetic powder according to the present disclosure includes a step of producing a magnetic powder by spray-drying a spray liquid containing first magnetic particles, second magnetic particles, a thermosetting resin, and an organic solvent. The magnetic powder includes the first magnetic particles and a thermosetting resin coating film on surfaces of the first magnetic particles. The first magnetic particles are soft magnetic metal particles. The resin coating film contains the second magnetic particles. The second magnetic particles have a smaller average particle size than the first magnetic particles.

A method for manufacturing a compact according to the present disclosure includes a step of producing a magnetic powder by the method for manufacturing a magnetic powder according to the present disclosure and a step of producing a compact by subjecting the magnetic powder to heat press molding to cure the thermosetting resin coating film.

A magnetic powder according to the present disclosure includes first magnetic particles and a thermosetting resin coating film on surfaces of the first magnetic particles. The first magnetic particles are soft magnetic metal particles. The resin coating film contains second magnetic particles. The second magnetic particles have a smaller average particle size than the first magnetic particles.

A compact according to the present disclosure contains the above magnetic powder.

The present disclosure provides a magnetic powder that contains fine magnetic particles but causes less aggregation.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 8 is a graph illustrating the frequency characteristics of the magnetic permeability in Example 2.

DETAILED DESCRIPTION

Figure 1:
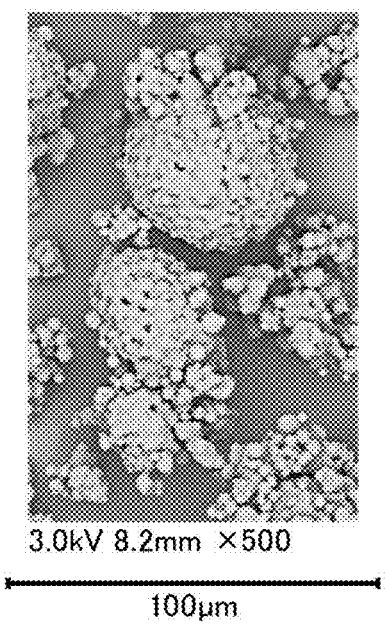
FIG. 1 is a scanning electron micrograph of an example of a magnetic powder obtained after spray-drying of a spray liquid.

Embodiments of the present disclosure will be described below.

However, the present disclosure is not limited to the following embodiments and can be modified as appropriate and applied without departing from the spirit of the present disclosure. A combination of two or more individual preferred configurations of the present disclosure described in the following embodiments is also within the present disclosure.

Method for Manufacturing Magnetic Powder

A method for manufacturing a magnetic powder according to the present disclosure includes a step of producing a magnetic powder by spray-drying a spray liquid.

The spray liquid contains first magnetic particles, second magnetic particles, a thermosetting resin, and an organic solvent.

For example, first magnetic particles, second magnetic particles, a thermosetting resin, and an organic solvent described below are used in Examples described below.

First magnetic particles: carbonyl iron powder (average particle size D50: about 5 μm) . . . A Second magnetic particles: manganese ferrite powder (composition: (FeO, MnO)·Fe$_2$O$_3$, average particle size: about 91 nm or about 250 nm) . . . B Main component of thermosetting resin: bisphenol A epoxy resin . . . C Curing agent for thermosetting resin: phenolic curing agent . . . D Organic solvent: methyl ethyl ketone . . . E Mixing ratio . . . first magnetic particles:second magnetic particles=about 75 mass %:about 25 mass % etc.

The ratio (C+D/A+B+C+D) of the total weight of the main component of the thermosetting resin and the curing agent for the thermosetting resin to the total weight of the first magnetic particles, the second magnetic particles, the main component of the thermosetting resin, and the curing agent for the thermosetting resin is defined as a "resin content". The ratio (A+B+C+D/A+B+C+D+E) of the total weight of the first magnetic particles, the second magnetic particles, the main component of the thermosetting resin, and the curing agent for the thermosetting resin to the total weight of the first magnetic particles, the second magnetic particles, the main component of the thermosetting resin, the curing agent for the thermosetting resin, and the organic solvent is defined as a "spray concentration". The spray liquid is prepared by, for example, mixing these components such that the resin content is about 10 mass % or less (2.5 mass % in Examples below) and diluting the mixture with the organic solvent such that the spray concentration is about 50 mass % or more and about 60 mass % or less (i.e., from about 50 mass % to about 60 mass %) (59.5 mass % in Examples below).

The first magnetic particles are soft magnetic metal particles. The soft magnetic metal particles may be a crystalline powder or an amorphous powder. Examples of the crystalline powder include Fe-based magnetic metal powders, such as a carbonyl iron powder, a sendust magnetic powder, a Fe—Si—Cr-based metal powder, and a Fe—Si metal powder; Fe—Ni-based magnetic metal powders, such as a permalloy magnetic powder; Fe—Co-based magnetic metal powders, such as permendur; and Fe—Si—B—Nb—Cu-based nanocrystalline magnetic metal powders. Examples of the amorphous powder include Fe—Si—Cr-based or Fe—B-based amorphous magnetic powders.

The second magnetic particles are, for example, metal oxide magnetic particles, and preferably ferrite magnetic particles. The use of metal oxide magnetic particles as the second magnetic particles can increase the insulating performance and safety of the compact compared with the use of metal magnetic particles as the second magnetic particles. The compact containing metal oxide magnetic particles is thus suitably used as a component for shielding electromagnetic interference (EMI) of high-speed signals.

In particular, when the second magnetic particles are ferrite magnetic particles, the compact has a high magnetic permeability and a low core loss up to a high-frequency band.

When the second magnetic particles are ferrite magnetic particles, the ferrite magnetic particles contain, for example, at least one ferrite selected from the group consisting of magnetite (iron ferrite), manganese ferrite, magnesium ferrite, strontium ferrite, nickel-zinc ferrite, and nickel ferrite.

When the second magnetic particles are ferrite magnetic particles, the ferrite magnetic particles preferably contain one or both of magnetite and manganese ferrite in total of about 65 mass % or more. The presence of a predetermined amount of one or both of magnetite and manganese ferrite in the ferrite magnetic particles increases the saturation magnetization.

Alternatively, the second magnetic particles may be metal magnetic particles. The use of metal magnetic particles as the second magnetic particles can improve the direct-current superposition characteristics of the compact. Such a compact is thus suitably used as an EMI shielding component, such as a power inductor.

The second magnetic particles are preferably substantially spherical. The term "spherical" includes a completely spherical shape and shapes close to a spherical shape. When the second magnetic particles are substantially spherical, the second magnetic particles can be densely packed between the first magnetic particles, increasing the magnetic permeability.

The second magnetic particles have a smaller average particle size than the first magnetic particles. When the second magnetic particles having a smaller average particle size than the first magnetic particles are mixed, the second magnetic particles can fill in gaps between the first magnetic particles in the obtained magnetic powder. The heat press molding of such a magnetic powder can produce a compact having a higher magnetic permeability.

The average particle size of the second magnetic particles is, for example, about 1 nm or more and about 1 μm or less (i.e., from about 1 nm to about 1 μm), preferably about 40 nm or more and about 250 nm or less (i.e., from about 40 nm to about 250 nm).

The average particle size of the second magnetic particles is preferably equal to or smaller than about $\frac{1}{10}$ the average particle size of the first magnetic particles.

The aggregation of the second magnetic particles can be prevented or reduced by controlling the average particle size of the second magnetic particles, such as ferrite magnetic particles, in the above range. Thus, the magnetic powder containing the first magnetic particles having a uniform resin coating film on the surfaces can be produced. The heat press molding of the magnetic powder can provide the compact in which the second magnetic particles are densely packed between the first magnetic particles.

The average particle size of the second magnetic particles is calculated from the average value of equivalent circle diameters of the particles (except particles the perimeters of which are partially invisible because of overlapping of the particles or other factors) obtained by image analysis through observation using a scanning electron microscope (SEM) at a magnification of 50,000 times. The average particle size of the first magnetic particles refers to the particle size D50 at a cumulative value of 50% in the particle size distribution obtained by the laser diffraction and scattering method.

The average particle size of the first magnetic particles is not limited but, for example, about 2 µm or more and about 35 µm or less (i.e., from about 2 µm to about 35 µm).

The first magnetic particles may be a combination of first magnetic coarse particles having a relatively large average particle size and first magnetic fine particles having a relatively small average particle size. In this case, the average particle size of the second magnetic particles is smaller than the average particle size of the first magnetic coarse particles and smaller than the average particle size of the first magnetic fine particles. The soft magnetic metal that forms the first magnetic coarse particles may be the same as or different from the soft magnetic metal that forms the first magnetic fine particles.

Examples of the main component of the thermosetting resin include a bisphenol A epoxy resin, a bisphenol F epoxy resin, a phenol novolac epoxy resin, a polyimide resin, and a polysulfide polymer. These main components may be used alone or in combination.

Examples of the curing agent for the thermosetting resin include phenolic curing agents, aromatic amine curing agents, imidazole curing agents, and imide curing agents. These curing agents may be used alone or in combination.

Examples of the organic solvent include methyl ethyl ketone, toluene, methyl acetate, ethyl acetate, and acetone.

Spray-drying of the obtained spray liquid can produce a magnetic powder containing the first magnetic particles having a thermosetting resin coating film on the surfaces and the second magnetic particles in the resin coating film.

The "thermosetting resin coating film" as used herein refers to a resin coating film made of uncured thermosetting resin. The uncured thermosetting resin not only includes a prepolymer of the thermosetting resin in an uncured state, but also includes the thermosetting resin in a B-stage being a semi-cured state in which curing starts to take place but curing is not complete.

Spray-drying of the spray liquid preferably uses a spray dryer with a two-fluid nozzle or a four-fluid nozzle (also called Micro Mist Spray Dryer). The organic solvent is volatilized by ejecting the spray liquid from the two-fluid nozzle or four-fluid nozzle to produce a magnetic powder.

For example, in Examples described below, the spray liquid is sprayed from the four-fluid nozzle of the Micro Mist Spray Dryer (evaporation capacity 1.3 kg/h) and dried by heating at a temperature of about 70° C. or higher and about 110° C. or lower (i.e., from about 70° C. to about 110° C.) in a drying chamber controlled to low oxygen partial pressure.

The resin content defined above is reduced by spray-drying the spray liquid. With a low resin content after spray-drying of the spray liquid, the first magnetic particles cause less aggregation, and a resin coating film is easily formed on the surface of each of the first magnetic particles. As a result, a magnetic powder having a uniform particle size can be produced at a time. Therefore, the obtained magnetic powder can be used as it is without the disintegrating step or the classifying step.

After spray-drying of the spray liquid, for example, the resin content being 2.5 mass % at the time of preparation of the spray liquid is reduced to 1.5 mass % in terms of actual value measured by thermogravimetric (TG) analysis after granulation. The resin content of the spray liquid after spray drying is preferably about 0.15 mass % or more and about 3 mass % or less (i.e., from about 0.15 mass % to about 3 mass %) in terms of actual value measured by TG analysis after granulation.

FIG. 1 is a scanning electron micrograph of an example of the magnetic powder obtained after spray-drying of the spray liquid.

In the magnetic powder obtained after spray-drying of the spray liquid, the first magnetic particles do not aggregate, and the resin coating film having the second magnetic particles buried therein is formed on the surface of each of the first magnetic particles as shown in FIG. 1. In FIG. 1, the magnetic powder has a maximum particle size of about 30 µm.

As described above, the method for manufacturing the magnetic powder according to the present disclosure prevents or reduces aggregation of the first magnetic particles and produces a magnetic powder having a uniform particle size at a time. This method eliminates the need of the disintegrating step, the classifying step, and other steps, and thus the obtained magnetic powder can be used as it is. Otherwise, the disintegrating step, the classifying step, and other steps can be simplified. The heat press molding of such a magnetic powder can produce a compact formed of densely packed magnetic powder, resulting in a high magnetic permeability.

Figure 2:
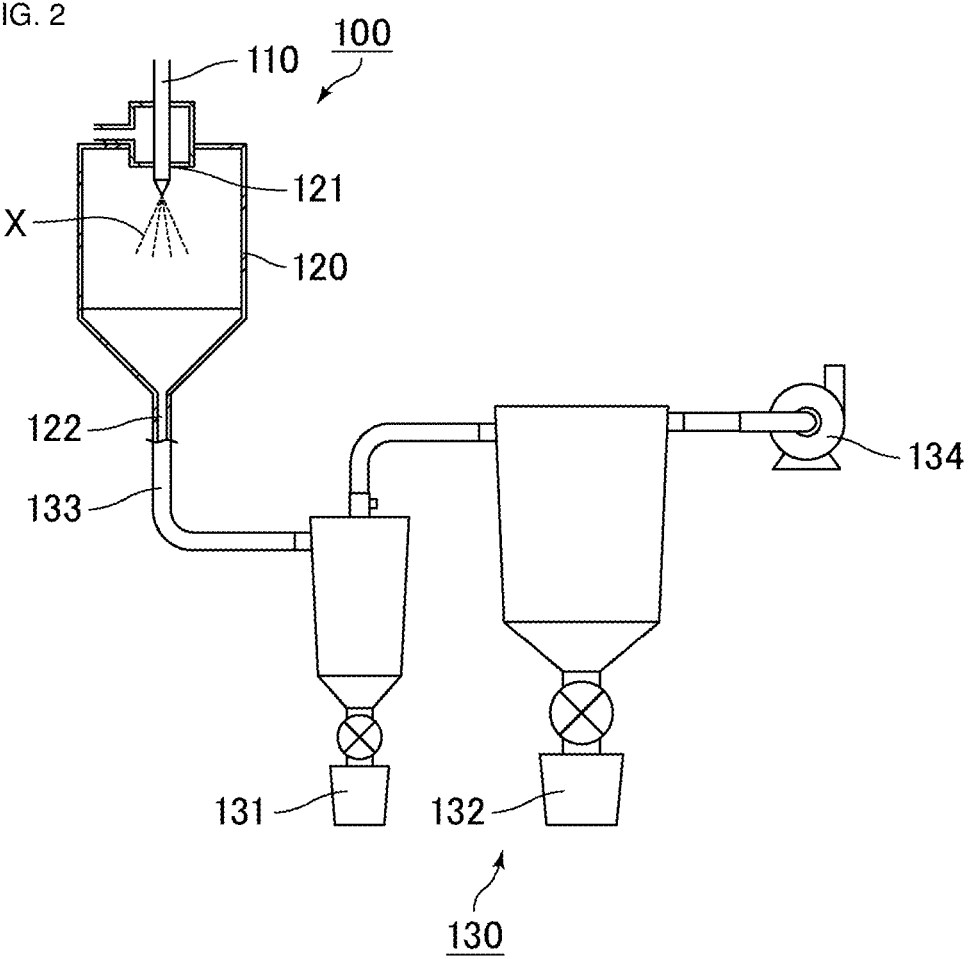
FIG. 2 is a schematic view of an example structure of a spray dryer with a two-fluid nozzle or a four-fluid nozzle.

FIG. 2 is a schematic view of an example structure of a spray dryer with a two-fluid nozzle or a four-fluid nozzle.

Referring to FIG. 2, a spray dryer 100 includes a nozzle 110, a drying chamber 120, and a collector 130. In the drying chamber 120, a spray liquid X is ejected from the nozzle 110, and an organic solvent contained in the spray liquid X is evaporated to dry a magnetic powder. The collector 130 collects the magnetic powder dried in the drying chamber 120.

The drying chamber 120 has a lid at the top in the vertical direction, and the nozzle 110 penetrates the lid. The nozzle 110 is a two-fluid nozzle or a four-fluid nozzle. The spray liquid X is ejected downward in the vertical direction from the nozzle 110. The lid has an inlet 121 through which a hot gas (e.g., air) flowing in the ejecting direction from the upstream side in the ejecting direction (downward in the vertical direction) of the spray liquid X from the nozzle 110 is supplied.

The drying chamber 120 has an outlet 122 on the downstream side in the vertical direction. The dried magnetic powder is discharged to the outside of the drying chamber 120 through the outlet 122.

The collector 130 includes a cyclone 131 and a bag filter 132. The outlet 122 of the drying chamber 120 communicates with the cyclone 131 through a pipe 133. The magnetic powder dried along the hot gas stream is transported to the cyclone 131 and collected by the cyclone 131. The dried magnetic powder that has not been collected by the cyclone 131 is collected by the bag filter 132 downstream of the cyclone 131 in the direction of the hot gas stream. One of the cyclone 131 and the bag filter 132 may be provided as a unit for collecting the magnetic powder, but the recovery rate of the magnetic powder can be improved by providing both the cyclone 131 and the bag filter 132. A blower 134 for exhausting gas inside the device is disposed downstream of the bag filter 132 in the direction of the hot gas stream. The hot gas and the air passing through the gas flow path of the nozzle 110 are discharged to the outside of the device through the blower 134.

Magnetic Powder

The magnetic powder produced through the above process includes first magnetic particles and a thermosetting resin coating film on surfaces of the first magnetic particles. The first magnetic particles are soft magnetic metal particles. The resin coating film contains second magnetic particles. The second magnetic particles have a smaller average particle size than the first magnetic particles. The magnetic powder is also one of the present disclosure.

Figure 3:
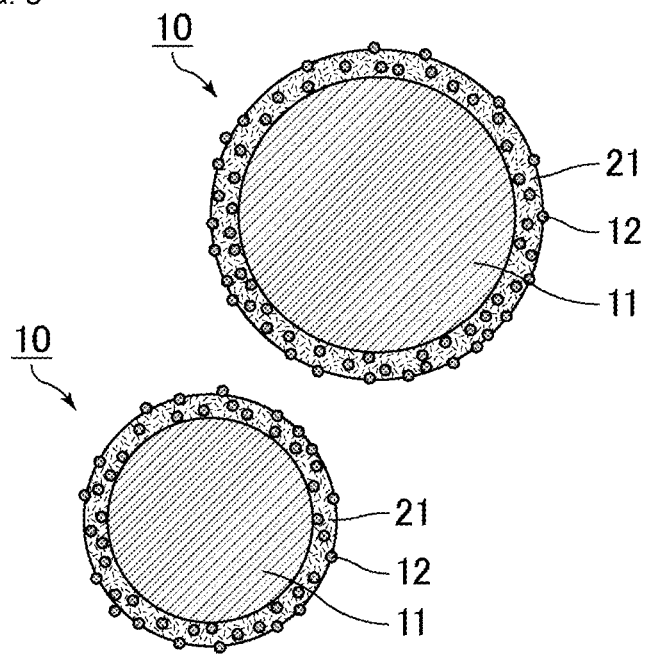
FIG. 3 is a schematic cross-sectional view of one example of a magnetic powder according to the present disclosure.

FIG. 3 is a schematic cross-sectional view of one example of a magnetic powder according to the present disclosure.

In a magnetic powder 10 shown in FIG. 3, a thermosetting resin coating film 21 is formed on the surface of a first magnetic particle 11. The resin coating film 21 contains second magnetic particles 12. In the magnetic powder 10 shown in FIG. 3, some of the second magnetic particles 12 are buried in the resin coating film 21, and the remaining second magnetic particles 12 protrude from the resin coating film 21. The magnetic powder 10 thus has an uneven surface. The resin coating film 21 may have a uniform thickness or may have different thicknesses at different places. The proportion of the second magnetic particles 12 buried in the resin coating film 21 and the proportion of the second magnetic particles 12 protruding from the resin coating film 21 can be adjusted with, for example, the particle sizes of the first magnetic particles and the second magnetic particles, and the mixing ratio between the first magnetic particles, the second magnetic particles, and the thermosetting resin.

Figure 4:
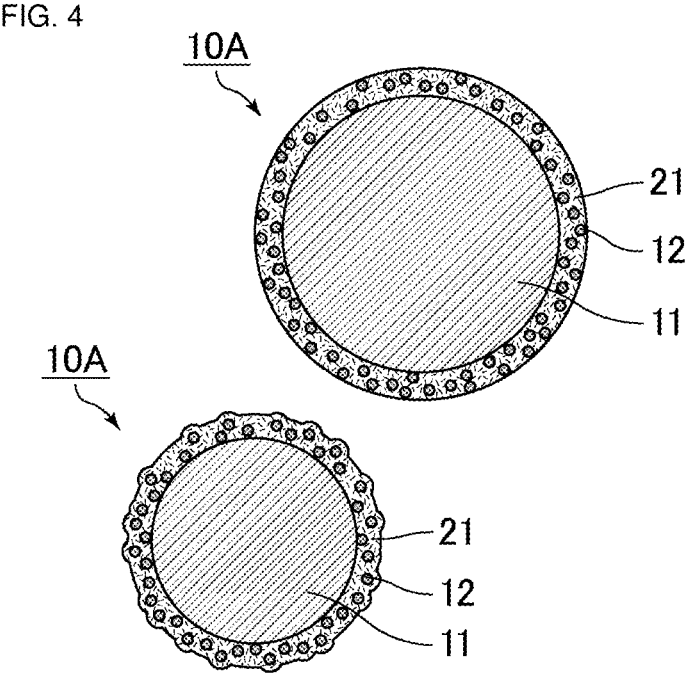
FIG. 4 is a schematic cross-sectional view of another example of the magnetic powder according to the present disclosure.

FIG. 4 is a schematic cross-sectional view of another example of the magnetic powder according to the present disclosure.

In a magnetic powder 10A shown in FIG. 4, a thermosetting resin coating film 21 is disposed on the surface of a first magnetic particle 11. The resin coating film 21 contains second magnetic particles 12. In the magnetic powder 10A shown in FIG. 4, all the second magnetic particles 12 are buried in the resin coating film 21. As shown in FIG. 4, the resin coating film 21 may have a uniform thickness or may have different thicknesses at different places. When the resin coating film 21 does not have a uniform thickness, the magnetic powder 10A has an uneven surface.

In the magnetic powder produced by the method for manufacturing a magnetic powder according to the present disclosure or in the magnetic powder according to the present disclosure, at least some of the second magnetic particles are preferably buried in the resin coating film, and all the second magnetic particles are more preferably buried in the resin coating film. When the second magnetic particles are buried in the resin coating film, the particles of the magnetic powder tend to be bonded to each other in the heat press molding of the magnetic powder for producing a compact described below.

The method for manufacturing a magnetic powder according to the present disclosure may produce a mixture containing the magnetic powder having some of the second magnetic particles protruding from the resin coating film as shown in FIG. 3 and the magnetic powder having the second magnetic particles all buried in the resin coating film as shown in FIG. 4. Similarly, the magnetic powder according to the present disclosure may be a mixture containing the magnetic powder having some of the second magnetic particles protruding from the resin coating film as shown in FIG. 3 and the magnetic powder having the second magnetic particles all buried in the resin coating film as shown in FIG. 4.

The first magnetic particles are soft magnetic metal particles. Examples of the soft magnetic metal particles include a crystalline powder and an amorphous powder. Examples of the crystalline powder include Fe-based magnetic metal powders, such as a carbonyl iron powder, a sendust magnetic powder, a Fe—Si—Cr-based metal powder, and a Fe—Si metal powder; Fe—Ni-based magnetic metal powders, such as a permalloy magnetic powder; Fe—Co-based magnetic metal powders, such as permendur; and Fe—Si—B—Nb—Cu-based nanocrystalline magnetic metal powders. Examples of the amorphous powder include Fe—Si—Cr-based or Fe—B—Si-based amorphous magnetic powders.

The second magnetic particles are, for example, metal oxide magnetic particles, and preferably ferrite magnetic particles.

When the second magnetic particles are ferrite magnetic particles, the ferrite magnetic particles contain, for example, at least one ferrite selected from the group consisting of magnetite (iron ferrite), manganese ferrite, magnesium ferrite, strontium ferrite, nickel-zinc ferrite, and nickel ferrite.

When the second magnetic particles are ferrite magnetic particles, the ferrite magnetic particles contain one or both of magnetite and manganese ferrite in total of 65 mass % or more. The presence of a predetermined amount of one or both of magnetite and manganese ferrite in the ferrite magnetic particles increases the saturation magnetization.

Alternatively, the second magnetic particles may be metal magnetic particles.

The second magnetic particles are preferably spherical.

The second magnetic particles have a smaller average particle size than the first magnetic particles.

The average particle size of the second magnetic particles is, for example, about 1 nm or more and about 1 μm or less (i.e., from about 1 nm to about 1 μm), preferably about 40 nm or more and about 250 nm or less (i.e., from about 40 nm to about 250 nm).

The average particle size of the second magnetic particles is preferably equal to or smaller than about 1/10 the average particle size of the first magnetic particles.

The average particle size of the first magnetic particles is not limited but, for example, about 2 μm or more and about 35 μm or less (i.e., from about 2 μm to about 35 μm).

Examples of the thermosetting resin include a bisphenol A epoxy resin, a bisphenol F epoxy resin, a phenol novolac epoxy resin, a polyimide resin, and a polyphenyl sulfide resin. These thermosetting resins may be used alone or in combination.

Method for Manufacturing Compact

A method for manufacturing a compact according to the present disclosure includes a step of producing a magnetic powder by the method for manufacturing a magnetic powder according to the present disclosure and a step of producing a compact by subjecting the magnetic powder to heat press molding to cure the thermosetting resin coating film.

In the method for manufacturing a compact according to the present disclosure, a magnetic powder containing first magnetic particles, second magnetic particles, and a resin coating film may be heat-pressed, or a mixture containing two or more magnetic powders, such as those in Modifications described below, may be heat-pressed.

Modification 1

A mixture containing a first magnetic powder containing first magnetic coarse particles, second magnetic particles, and a resin coating film and a second magnetic powder containing first magnetic fine particles, second magnetic particles, and a resin coating film.

Modification 2

A mixture containing a first magnetic powder containing first magnetic coarse particles, second magnetic particles, and a resin coating film and a second magnetic powder containing first magnetic fine particles and a resin coating film.

Modification 3

A mixture containing a first magnetic powder containing first magnetic coarse particles and a resin coating film and a second magnetic powder containing first magnetic fine particles, second magnetic particles, and a resin coating film.

The step of producing a compact may involve subjecting a mixture containing the magnetic powder and an oxide powder to heat press molding. In this case, the oxide powder functions as a lubricant and improves the fluidity of the magnetic powder during heat press.

The oxide powder may be, for example, silica particles, such as fumed silica.

The oxide powder preferably has an average particle size of about 10 nm or more and about 100 nm or less (i.e., from about 10 nm to about 100 nm).

The amount of the oxide powder added is preferably about 0.1 parts by weight or more and about 0.25 parts by weight or less (i.e., from about 0.1 parts by weight to about 0.25 parts by weight) relative to 100 parts by weight of the magnetic powder.

Compact

The compact produced through the above process is used as, for example, a powder magnetic core. Thus, the method for manufacturing a compact according to the present disclosure may further include a step of disposing a coil conductor inside the compact or on the surface of the compact.

The compact containing the magnetic powder according to the present disclosure is also one of the present disclosure. The compact according to the present disclosure may further contain the oxide powder described above.

The compact according to the present disclosure is used as, for example, a powder magnetic core. Thus, the compact according to the present disclosure may be such that a coil conductor is disposed inside the compact or on the surface of the compact.

Figure 5:
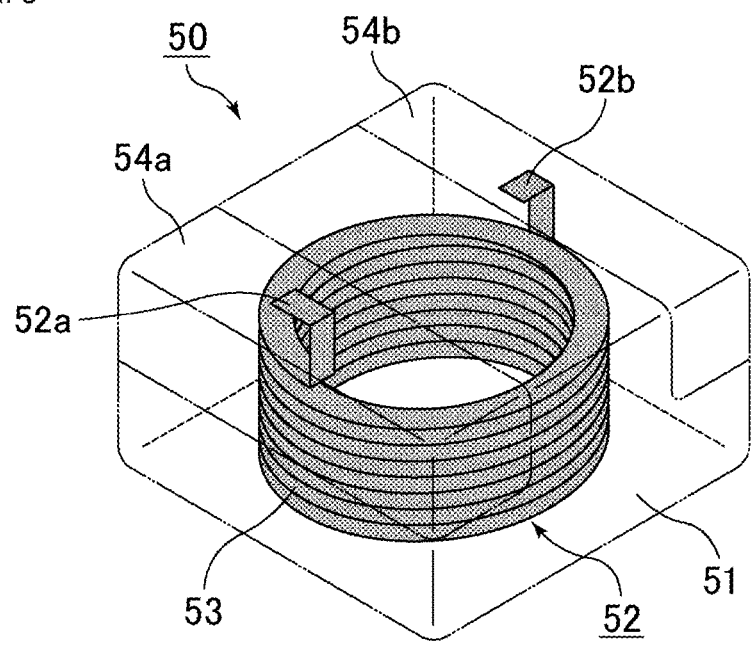
FIG. 5 is a schematic perspective view of one example of a coil component including a powder magnetic core.

FIG. 5 is a schematic perspective view of one example of a coil component including a powder magnetic core.

A coil component 50 shown in FIG. 5 is an example of a compact having a coil conductor inside. The coil component 50 includes a powder magnetic core 51 having a box shape and a coil conductor 53 having a conducting wire 52 buried in the powder magnetic core 51. A first end portion 52a and a second end portion 52b of the conducting wire 52 are positioned on the surface of the powder magnetic core 51 and exposed. The surface of the powder magnetic core 51 is partially covered by a first connection end portion 54a and a second connection end portion 54b, which are electrically independent of each other. The first connection end portion 54a is electrically connected to the first end portion 52a of the conducting wire 52, and the second connection end portion 54b is electrically connected to the second end portion 52b of the conducting wire 52. In the coil component 50, the first end portion 52a of the conducting wire 52 is covered by the first connection end portion 54a, and the second end portion 52b of the conducting wire 52 is covered by the second connection end portion 54b.

The coil conductor 53 may be buried in the powder magnetic core 51 by any method. One example method may involve placing a wound conducting wire 52 in a mold, and further supplying a magnetic powder into the mold, followed by heat press molding. Another example method may involve preparing components formed by molding a magnetic powder in advance, assembling the components while placing the conducting wire 52 in a space defined by the components to form an assembly, and subjecting the assembly to heat press molding.

Figure 6:
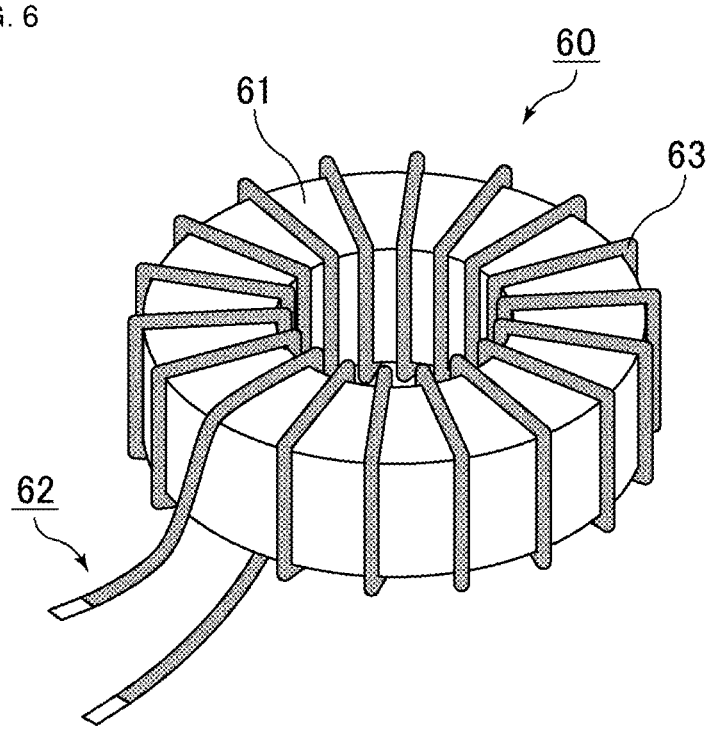
FIG. 6 is a schematic perspective view of another example of the coil component including the powder magnetic core.

FIG. 6 is a schematic perspective view of another example of the coil component including a powder magnetic core.

A coil component 60 shown in FIG. 6 is an example of a compact having a coil conductor on the surface. The coil component 60 includes a powder magnetic core (ring core) 61 having a ring shape and a coil conductor 63 having a conducting wire 62 wound around the surface of the powder magnetic core 61.

EXAMPLES

Examples, which more specifically disclose the present disclosure, will be described below. The present disclosure is not limited only to these Examples.

Example 1

Figure 7:
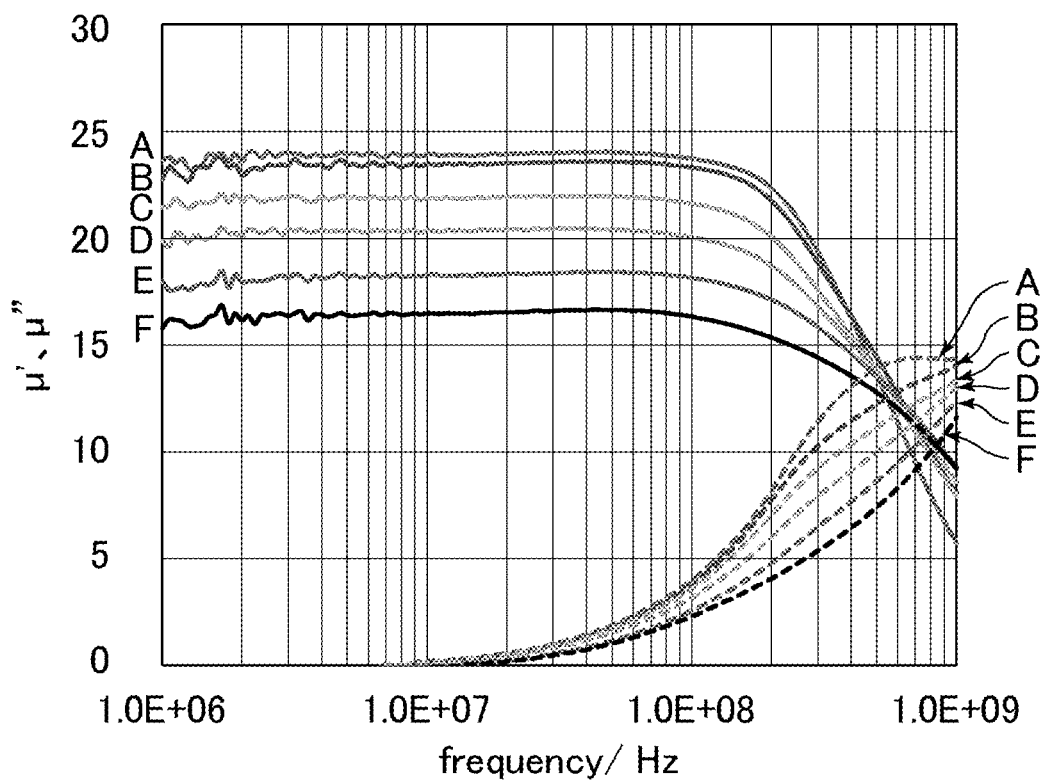
FIG. 7 is a graph illustrating the frequency characteristics of the magnetic permeability in Example 1.

A magnetic powder was produced by spray-drying a spray liquid containing first magnetic particles, second magnetic particles, a thermosetting resin, and an organic solvent. A carbonyl iron powder having an average particle size of 5 µm was used as the first magnetic particles, a manganese ferrite powder having an average particle size of 91 nm as the second magnetic particles, a bisphenol A epoxy resin as a main component of the thermosetting resin, and a phenolic curing agent as a curing agent for the thermosetting resin. The mixing ratio of the first magnetic particles to the second magnetic particles is shown in FIG. 7. The resin content at the time of preparation was 2.4 mass %, and the resin content after drying was 1.5 mass % in terms of actual value measured by TG analysis after granulation. In the magnetic powder of Example 1, the first magnetic particles caused less aggregation, and the resin coating film having the second magnetic particles buried therein was formed on the surfaces of the first magnetic particles. The obtained magnetic powder was subjected to heat press molding at 150° C. and 690 MPa for 30 minutes and then heated at 150° C. for 2 hours to produce a ring core sample.

Example 2

A manganese ferrite powder having an average particle size of 250 nm was used as the second magnetic particles, and the mixing ratio of the first magnetic particles to the second magnetic particles was changed to the value shown in FIG. 8. Otherwise, a magnetic powder and a ring core sample were produced by the same methods as in Example 1. In the magnetic powder of Example 2, the first magnetic particles caused less aggregation, and the resin coating film having the second magnetic particles buried therein was formed on the surfaces of the first magnetic particles.

The magnetic permeability of the produced ring core sample was measured by using the Keysight E4991A RF impedance/material analyzer.

FIG. 7 is a graph illustrating the frequency characteristics of the magnetic permeability in Example 1. FIG. 8 is a graph illustrating the frequency characteristics of the magnetic permeability in Example 2. In FIG. 7 and FIG. 8, the mixing ratio of the first magnetic particles to the second magnetic particles represents the weight ratio. In FIG. 7 and FIG. 8, the real part $\mu'$ of the magnetic permeability is indicated by solid lines, and the imaginary part $\mu''$ representing losses is indicated by dashed lines.

As shown in FIG. 7 and FIG. 8, a high magnetic permeability is achieved by the presence of the second magnetic particles in the resin coating film on the surfaces of the first magnetic particles. In addition, the use of ferrite magnetic particles as the second magnetic particles results in a high magnetic permeability and a low core loss up to a high-frequency band.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for manufacturing a magnetic powder, the method comprising:
   producing a magnetic powder by spray-drying a spray liquid containing first magnetic particles, second magnetic particles, a thermosetting resin, and an organic solvent,
   wherein the magnetic powder includes the first magnetic particles and a thermosetting resin coating film on surfaces of the first magnetic particles,
   the first magnetic particles are soft magnetic metal particles,
   the resin coating film contains the second magnetic particles, and
   the second magnetic particles have a smaller average particle size than the first magnetic particles.

2. The method for manufacturing a magnetic powder according to claim 1, wherein
   the second magnetic particles are buried in the resin coating film.

3. The method for manufacturing a magnetic powder according to claim 1, wherein
   the second magnetic particles have an average particle size of from 1 nm to 1 μm.

4. The method for manufacturing a magnetic powder according to claim 1, wherein
   the average particle size of the second magnetic particles is equal to or smaller than 1/10 an average particle size of the first magnetic particles.

5. The method for manufacturing a magnetic powder according to claim 1, wherein
   the second magnetic particles are metal oxide magnetic particles.

6. The method for manufacturing a magnetic powder according to claim 1, wherein
   the second magnetic particles are ferrite magnetic particles.

7. The method for manufacturing a magnetic powder according to claim 6, wherein
   the ferrite magnetic particles contain at least one ferrite selected from the group consisting of magnetite, manganese ferrite, magnesium ferrite, strontium ferrite, nickel-zinc ferrite, and nickel ferrite.

8. The method for manufacturing a magnetic powder according to claim 6, wherein
   the ferrite magnetic particles contain one or both of magnetite and manganese ferrite in total of 65 mass % or more.

9. The method for manufacturing a magnetic powder according to claim 1, wherein
   the second magnetic particles are spherical.

10. A method for manufacturing a compact, the method comprising:
    producing a magnetic powder by the method for manufacturing a magnetic powder according to claim 1, and
    producing a compact by subjecting the magnetic powder to heat press molding to cure the thermosetting resin coating film.

11. The method for manufacturing a compact according to claim 10, wherein
    the producing of a compact involves subjecting a mixture containing the magnetic powder and an oxide powder to heat press molding.

12. The method for manufacturing a compact according to claim 10, wherein
    the compact is a powder magnetic core.

13. The method for manufacturing a compact according to claim 10, further comprising:
    disposing a coil conductor inside the compact or on a surface of the compact.

14. A magnetic powder comprising:
    first magnetic particles, and
    a thermosetting resin coating film on surfaces of the first magnetic particles,
    wherein the first magnetic particles are soft magnetic metal particles,
    the resin coating film contains second magnetic particles, and
    the second magnetic particles have a smaller average particle size than the first magnetic particles.

15. The magnetic powder according to claim 14, wherein
    the second magnetic particles are buried in the resin coating film.

16. The magnetic powder according to claim 14, wherein
    the second magnetic particles have an average particle size of from 1 nm to 1 μm.

17. The magnetic powder according to claim 14, wherein
    the average particle size of the second magnetic particles is equal to or smaller than 1/10 an average particle size of the first magnetic particles.

18. The magnetic powder according to claim 14, wherein
    the second magnetic particles are metal oxide magnetic particles.

19. The magnetic powder according to claim 14, wherein
    the second magnetic particles are ferrite magnetic particles.

20. The magnetic powder according to claim 19, wherein
    the ferrite magnetic particles contain at least one ferrite selected from the group consisting of magnetite, manganese ferrite, magnesium ferrite, strontium ferrite, nickel-zinc ferrite, and nickel ferrite.

* * * * *